Aug. 28, 1923.

E. C. GLOVER

BOLT

Filed Sept. 15, 1922

1,466,223

Inventor

E.C.Glover,

By C.A.Snow&Co.

Attorneys

Patented Aug. 28, 1923.

1,466,223

UNITED STATES PATENT OFFICE.

EDMOND C. GLOVER, OF RISON, ARKANSAS.

BOLT.

Application filed September 15, 1922. Serial No. 588,383.

*To all whom it may concern:*

Be it known that I, EDMOND C. GLOVER, a citizen of the United States, residing at Rison, in the county of Cleveland and State of Arkansas, have invented a new and useful Bolt, of which the following is a specification.

This invention relates to bolts and more particularly to those used in spring shackle spindle arms which supply lubricant to the bearings.

The object of the invention is to provide a bolt of this character so constructed that the lubricant supplied through such bolt will pass freely therethrough and be evenly distributed, and in which clogged grease may be easily forced out by new grease forced into the bolt.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1:
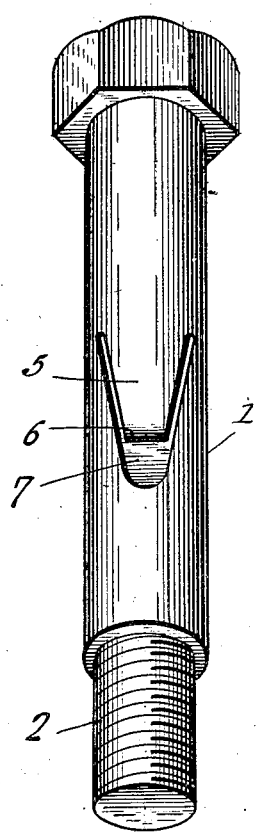
Figure 1 represents a perspective view of a body embodying this invention.
Figure 2:
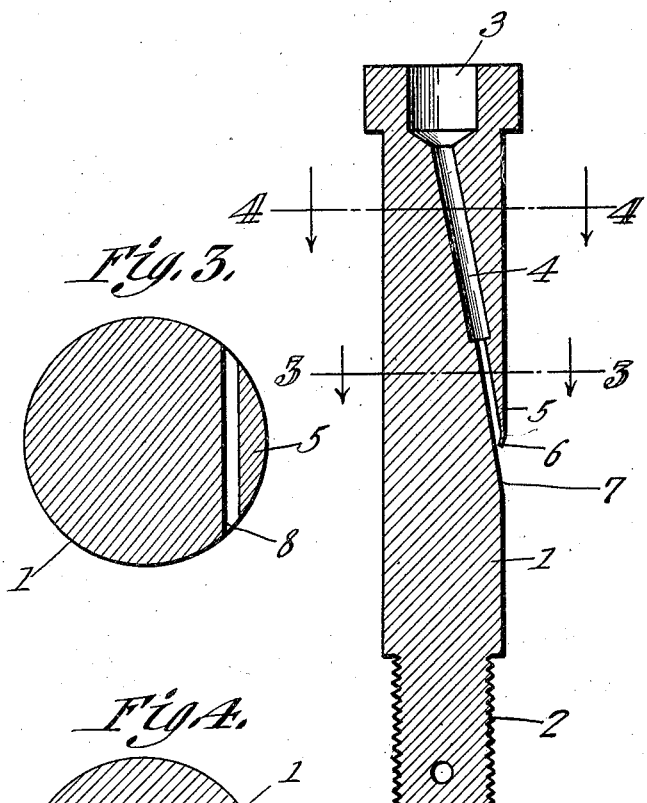
Fig. 2 is a longitudinal section thereof.

The bolt constituting this invention comprises a body portion 1 having a threaded terminal 2 for the reception of the ordinary nut used in connection with bolts of this character and which is provided in the headed end thereof with a lubricant chamber 3. A conduit 4 leads from said chamber 3 extending obliquely longitudinally through the bolt opening through one side wall thereof under a protective spring tongue 5 which is formed by a fine saw cut made in the bolt near the center thereof. This tongue 5 tapers in width and thickness from its base toward its free end, the latter of which is made sufficiently thin to permit it to yield and move outward when grease is forced through the conduit and discharged under it. This thinned end 6 of the tongue is bent slightly inward until it nearly touches the body of the bolt as is shown clearly in Fig. 2, being preferably truncated, the saw cut extending slightly in advance thereof as shown at 7, the outer face of the tongue 5 being substantially flush with the outer face of the bolt body 1.

Figure 3:
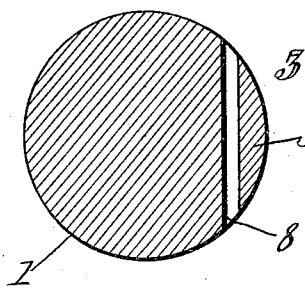
Fig. 3 is a transverse section, taken on the line 3—3 of Fig. 2.
Figure 4:
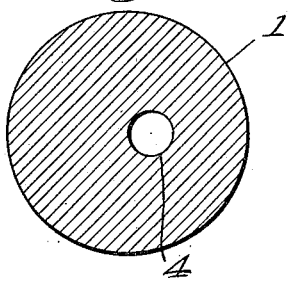
Fig. 4 is a similar view taken on the line 4—4 of Fig. 2.

This arrangement of the conduit 4 with the tongue 5 positioned over the discharge end thereof permits the grease or oil forced through the conduit to have a free exit and to be evenly distributed, the opening under the tongue extending transversely across the bolt as is shown clearly at 8 in Fig. 3. Should the saw cut become choked with hardened or gummy grease which may have formed by neglecting the lubrication, the grease forced into the bolt and under the tongue will cause the flexible end of the tongue to be slightly moved outward which will allow the grease or oil to pass out. When the bolt is placed ready for service, the saw cut will be positioned vertically with the tongue on the side if used horizontally.

I claim:—

1. A bolt of the class described having an oil conduit extending obliquely from one end through the side wall thereof, with a flexible tongue overlying the discharge end of the conduit.

2. A bolt of the class described having an oil conduit extending obliquely from one end through the side wall thereof, with a longitudinally extending tongue overlying the discharge end of the conduit, the free end of said tongue being thinned to render it flexible.

3. A bolt of the class described having an oil conduit extending obliquely from one end through the side wall thereof with a longitudinally extending tongue overlying the discharge end of the conduit, the free end of said tongue being thinned to render it flexible, said tongue tapering in width and thickness from its base to its free end, said end being truncated.

4. A bolt of the class described having an oil conduit extending obliquely from one end through one side wall thereof, the terminal of said conduit being widened and having a protective longitudinally extending tongue arranged thereover.

In testimony that I claim the foregoing as my own, I have hereto affixed my signature in the presence of two witnesses.

EDMOND C. GLOVER.

Witnesses:
 Roy Anderson,
 Dave McLemore.